(12) United States Patent
Uthaman et al.

(10) Patent No.: US 11,132,721 B1
(45) Date of Patent: Sep. 28, 2021

(54) INTEREST BASED ADVERTISING INSIDE A CONTENT DELIVERY NETWORK

(71) Applicant: Amazon Technologies, Inc., Seattle, WA (US)

(72) Inventors: Karthik Uthaman, Seattle, WA (US); Ronil Sudhir Mokashi, Mercer Island, WA (US); Prashant Verma, Seattle, WA (US); Sayalee Uday Wandkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/115,424

(22) Filed: Aug. 28, 2018

(51) Int. Cl.
| | |
|---|---|
| *G06Q 30/00* | (2012.01) |
| *G06Q 30/02* | (2012.01) |
| *G06N 20/00* | (2019.01) |
| *G06F 16/951* | (2019.01) |
| *G06F 16/955* | (2019.01) |
| *G06F 16/958* | (2019.01) |

(52) U.S. Cl.
CPC ....... *G06Q 30/0277* (2013.01); *G06F 16/951* (2019.01); *G06F 16/955* (2019.01); *G06F 16/958* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2008/0243634 | A1* | 10/2008 | Dworkin | G06Q 30/0601 705/26.1 |
| 2012/0023201 | A1* | 1/2012 | Gideon | H04N 21/422 709/219 |
| 2016/0267397 | A1* | 9/2016 | Carlsson | G16H 50/20 |
| 2017/0104839 | A1* | 4/2017 | Starsinic | H04L 67/2842 |
| 2018/0285767 | A1* | 10/2018 | Chew | H04L 41/142 |
| 2020/0137148 | A1* | 4/2020 | Segal | H04L 43/12 |

OTHER PUBLICATIONS

STIC EIC 3600 Search Report for U.S. Appl. No. 16/115,424 dated Sep. 14, 2020. (Year: 2020).*

* cited by examiner

*Primary Examiner* — Matthew T Sittner
(74) *Attorney, Agent, or Firm* — Davis Wright Tremaine LLP

(57) ABSTRACT

A system, method, and computer readable medium for distributing data objects that are dynamically customized for users in a content delivery network. The system obtains information based on content accessed by a user, the content being accessed by the user through a content delivery network device. The system associates the user with other users based on the obtained information, the other users having accessed another content through the content delivery network device. The system generates a cluster, the cluster comprising a plurality of nodes representative of the user and the associated other users. The system determines a set of tags for the cluster, the set of tags derived from a plurality of websites accessed by the user.

20 Claims, 11 Drawing Sheets

INTEREST BASED ADVERTISING INSIDE A CONTENT DELIVERY NETWORK

BACKGROUND

A Content Delivery Network ("CDN") is a global distributed service that can be used by a content provider to distribute content to their viewers while reducing network latency. For example, a content provider may use CDNs to push content in its origin server and enable one or more CDN servers (also referred herein as "edge servers" or "edge devices") to cache such content, after which the content can be served to a user by an edge device of an Internet Point of Presence ("PoP") (also referred herein as "edge location") closest to the location of the user. Because the CDN is configured to provide content from locations that are closest to the user, publishers of websites, blogs, video catalogue, and applications may leverage CDNs to increase network response time when providing large multimedia files to the viewers.

To optimize user experience, content providers use a combination of static and dynamic content and provide them to the CDN for distribution. In several aspects, content providers generate certain files (e.g., website logos, news articles) that remain static throughout the CDN. Concurrently, content providers may designate one or more display regions or frames in a web document that embed dynamic content. For example, a social media provider may provide their logos and navigational elements as static content which are cached in an edge device, while providing news feeds, status updates, and advertisements as dynamic content. However, providing dynamic content that is custom tailored for each user may require increased network traffic because user preferences, browsing histories, and cookies are typically submitted to big data systems at a central location for processing. Accordingly, it is challenging to provide dynamic content to users while maintaining optimal network response rates in the CDN.

BRIEF DESCRIPTION OF THE DRAWINGS

Various techniques will be described with reference to the drawings, in which.

DETAILED DESCRIPTION

Figure 1:
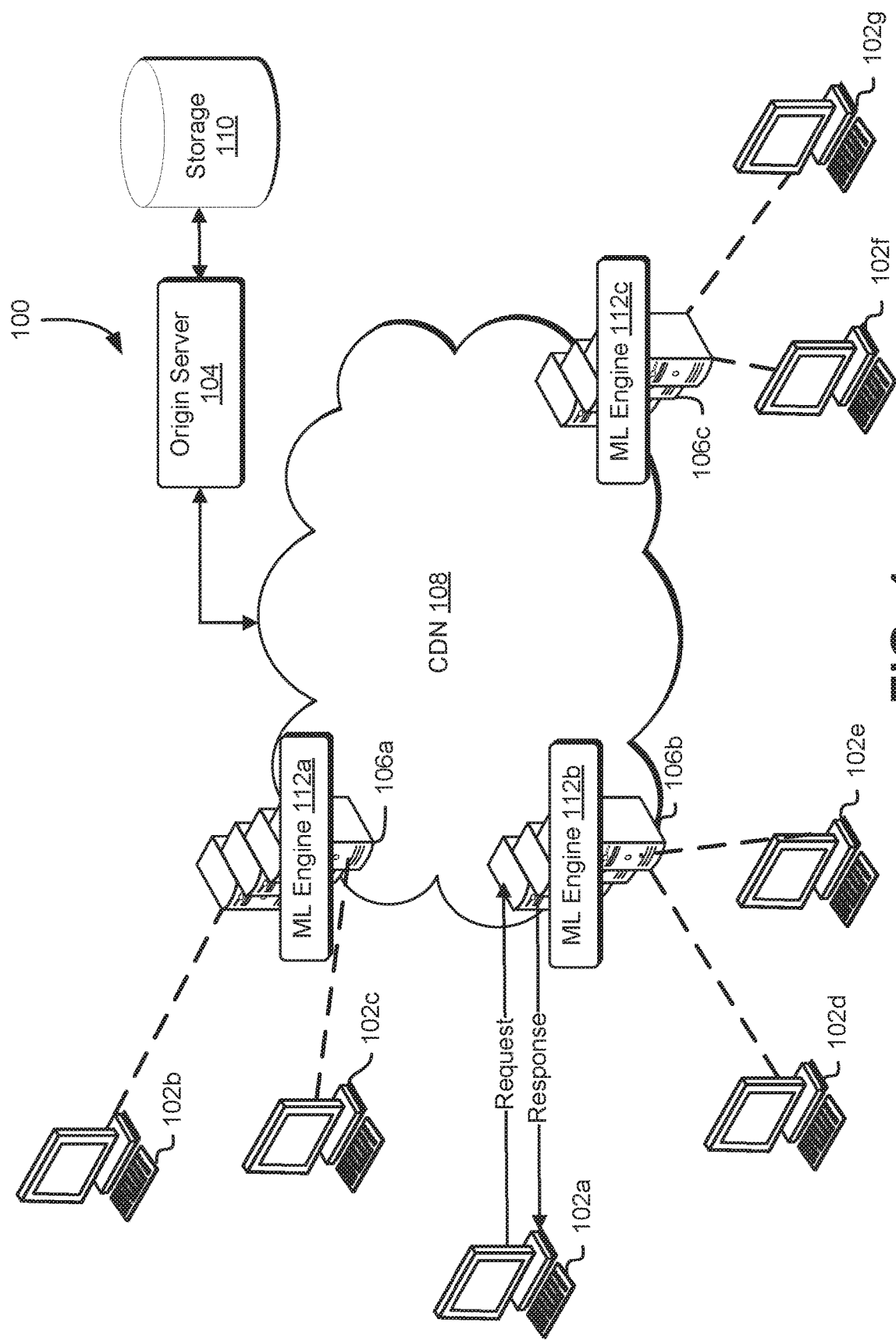
FIG. 1 illustrates an example diagram of a data processing environment that implements a content delivery network with distributed machine learning models in accordance with an embodiment.

Techniques described and suggested herein include systems, methods, and processes for delivering data objects dynamically customized for users in a CDN by leveraging machine learning ("ML") algorithms that are performed at the edge devices. In several aspects of the present invention, one or more edge devices obtain a plurality of data objects (e.g., multimedia files, text) from an origin server and apply machine learning algorithms to select the most relevant data objects that can be provided in response to the user's request. In one example, the edge devices may receive a user request to retrieve a web page, obtain one or more tags associated with content previously viewed by the user, select one or more data objects provided by the origin servers by executing ML algorithms with the tags and the data objects as input, embed the selected data objects in one or more regions of the web page, and return the customized web page to the user.

The content provider may serve static and/or dynamic content to a user through the edge devices of the PoPs in the CDN. Static content may be any content that can be delivered to an end user exactly as stored, without having to be generated, modified, or processed. In static content distribution model, the server delivers the same file to each user, making static content one of the simplest and most efficient content types to transmit over the Internet. In contrast, dynamic content may be content that constantly or regularly changes based on user interactions, timing and other parameters that determine what content is delivered to the user. This means that dynamic content may differ for every user, because each user may have different configurations, browsing preferences, search history, etc.

In one implementation, each content provider in a CDN may use a configuration which maps their domain name to their origin server and further use a set of cache configuration to be applied to their static or dynamic content. When one of these providers desires to distribute content, they can integrate the CDN provided script to a frame or region within their content, such as a web document, so as to allow the dynamic content to be displayed at such region of the content output. Moreover, content providers may configure the CDN servers to include one or more tags to their distributed content, in which the tags can be certain keywords that are most relevant to their content. For example, a content provider providing sports news articles may designate tags like "sports, entertainment, baseball, football, seahawks" to their corresponding web pages, whereas another content provider running a floral shop website may associate their content with tags like "flowers, bouquet, daisy, gift, mother's day, valentine's day."

An edge device of a PoP monitors each user browsing different web pages in location covered by the PoP and obtains one or more tags associated with each visited web page. The edge device then associates these tags with an identifier of each corresponding user, in which the identifier may include the user's IP address and/or unique IDs identified based on syncing the cookie files stored in the user's browser application. Afterwards, the edge device can generate a list of relevant tags for each user identifier. In some implementations, the edge device may provide the aggregated tags to a big data system which in turn may generate the list of relevant tags, after which a ML engine of the edge device can use the list of relevant tags to select the appropriate content to be provided back to the user. Generating the list of relevant tags may occur while a user is accessing a website through a specific PoP of the CDN. In other implementations, generating the list of relevant tags may occur asynchronously from any user operations performed in the PoP.

As CDNs are capable of serve up to trillions of requests a day to millions of unique users, processing the tags associated with each user and applying a machine learning algorithm enables a content provider to identify patterns of interests of the viewers. Based on the identified patterns of interests, a content provider can customize one or more responses to user requests so as to provide relevant content to the users. In some implementations in which a user has no previous activities detected by the PoP, the edge device of the PoP may obtain the tags associated with the content the user is currently accessing and present a set of data objects in a similar category as the content. For example, if a viewer watching a video on a sports blog, the edge device streaming the video can extract tags of the web page displaying the video file and provide one or more data objects that dynamically transform the display of the sports blog to include additional content such as a sports equipment advertisement or social network status updates of another user discussing about an upcoming sports event. In some implementations, the edge server may have determined that enough information about the user exists, such as determining that a history of web pages the user has accessed through a particular PoP has been previously recorded. In such cases, the edge servers of the PoP may asynchronously process the information to identify the relevant tags of the user.

In several implementations, the ML algorithms executed by the edge device obtains a set of tags for each user who accessed content through the PoP, then forms machine learning models, including machine learning clusters (also referred herein as "clusters"), of the users so that each cluster includes a set of users that have share similar tags. After cluster formation, the edge device of the PoP trains a ML model on those clusters to identify the most relevant tags then assigns the most relevant tags for each cluster. In one implementation, the relevant tags of the cluster can be further ranked based on the output from the ML model. During the inference stage, as a viewer traverses the content provider's sites, the edge device collects one or more tags based on the content with which the viewer is viewing or engaging. Based on the collected tags, the edge device evaluates the ML model to determine a cluster that has similar interests to the user. From there, the tags assigned to the cluster can be used to select a set of data objects that match the most number of the tags of the cluster or have a strong affinity towards one of the most relevant tag assigned to the cluster. The selected data objects can then be included with the content being generated in response to the viewer request. In some implementations, each data object can be assigned with a score based on determining whether its own associated tags match one or more tags of the cluster, then the score of such data object can be normalized by being applied with an exponentially decaying weight factor.

In several implementations, a content provider may generate and provide its own static or dynamic content for the users, but also relay content generated by other third party content providers (e.g., third party advertisers). For example, a content provider may interact with data store platforms, such as ad exchanges, to fetch a set of data objects that can be cached in the edge devices of the CDN. In another example, the content provider may obtain the content directly from one or more third party providers, including the providers who do not serve content to the users through the CDN. In other words, the implementations of the present invention can be extended to allow non-publishers of the CDN to still provide content through the CDN by enabling the non-publishers to provide their content to the content provider that publishes its content to the users through the CDN.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. Because the machine learning algorithms are performed by the edge locations closer to the users, techniques of this disclosure enable network response time to be improved as compared to conventional big data systems in which the data processing is typically performed by a central server away from the user location. In addition, by enabling the edge devices to perform machine learning techniques, techniques disclosed herein can reduce the network round-trip time and network latency since relevant data may remain at the edge device level rather than taking extra steps to query and respond to a big data system. In some examples, the training of the machine learning models may occur asynchronously from the user activity in the edge location so as to maintain network availability for users accessing content through CDN. Moreover, techniques disclosed herein may increase data security by keeping user data at the PoPs as compared to transmitting such user data to other servers in the CDN. Finally, because the machine learning operations occur at the edge locations closer to the user, the machine learning models generated in edge locations are more relevant, accurate, and less stale in comparison to the machine learning models in which training occurs at one central server location.

FIG. 1 illustrates an example diagram of a data processing environment 100 implementing a content delivery network 108 with distributed machine learning models in accordance with an embodiment. The network computing environment 100 can include a number of client devices 102a-102g. Although not shown, data processing environment 100 may include one or more content providers that distribute content initially from an origin server 104 to a set of edge devices 106a-106c in CDN 108 that are located near to client devices 102a-102g. Although illustrated with limited numbers of devices, data processing environment 100 may include a plurality of origin servers 104, edge devices 106a-106c, CDN 108, and/or storage components 110. Moreover, each origin server 104 and corresponding edge devices 106a-106c may be associated with different entities.

As illustrated in FIG. 1, data processing environment 100 includes a number of client devices (or interchangeably referred to as "client") 102 that request content from content providers, which may then relay the content from origin server 104 to the set of edge devices 106a-106c. In one embodiment, client devices 102a-102g can correspond to a wide variety of computing devices including personal computing devices, laptop computing devices, hand-held computing devices, terminal computing devices, mobile devices (e.g., mobile phones, smart phones, tablet computing devices), wireless devices, and other types of devices configured to communicate over network 108. In several embodiments, client devices 102a-102g include hardware and software components for establishing communications over network 108. For example, client devices 102a-102g may be equipped with networking equipment and browser software applications that facilitate communications via a network (e.g., the Internet) or an intranet. Client devices 102a-102g may have varied local computing resources such as central processing units and architectures, memory, mass storage, graphics processing units, communication network availability and bandwidth, etc. Although termed "client," client devices 102a-102g can include any type of user computing device and are not limited to a client device of a client/server architecture.

The network 108 can include any type of communication network. For example, the network 108 can include one or more of a wide area network (WAN), a local area network (LAN), a cellular network, an ad hoc network, a satellite network, a wired network, a wireless network, etc. Further, in some cases, the network 108 can include the Internet.

Data processing environment 100 can also include origin server 104 communicatively coupled to one or more edge devices 106a-106c located within CDN 108, which are in turn connected to client devices 102a-102g. Origin server 104 as illustrated in FIG. 1 may correspond to one or more content provider systems associated with a content provider entity and may provide static or dynamic content in response to requests generated from client devices 102a-102g. Specifically, origin server 104 can include a web server component corresponding to one or more server computing devices for obtaining and processing requests for content (such as Web pages) from client devices 102a-102g or other service providers, including third party content providers such as ad exchanges. Origin server 104 can further include a storage component 110 that may store files and other types of data objects that can be cached in edge devices 106a-106c. In several embodiments, origin server 104 may also process streaming content requests directly to clients 102. One skilled in the relevant art will appreciate that origin server 104 of the content provider can be associated with various additional computing resources, such as additional computing devices for administration of content and resources, domain name system ("DNS") name servers, and the like. For example, although not illustrated in FIG. 1, origin server 104 can be associated with one or more DNS name server components that would be authoritative to resolve client DNS queries corresponding to a domain of the content provider. Further, although termed "server", origin server 104 include any type of computing devices for providing access to a network resource and are not limited to servers of a client/server architecture.

With continued reference to FIG. 1, CDN 108 may include one or more PoPs (not shown) which are artificial demarcation points or interface points between communicating entities. Each PoP typically houses edge device 106 which can be comprised of one or more servers, routers, network switches, multiplexers, and other network interface equipment. In several embodiments, edge devices 106a-106c of PoPs may communicate to client devices 102a-102g through communication network 108. In some embodiments, edge devices 106a-106c may be geographically disparate. For example, edge device 106a may respond to requests originating from France, while edge device 106b may respond to requests originating from Mexico. In several embodiments, edge devices 106a-106c may include DNS components that resolve domain name queries from the client devices 102a-102g or other computing systems accessing CDN 108. Edge devices 106a-106c may also include resource cache components that store resources from origin server 104 and transmitting various requested resources to client devices 102a-102g. In several embodiments, edge devices 106a-106c may further include additional software and/or hardware components that facilitate communications including, but not limited to, load balancing or load sharing software/hardware components.

In an illustrative embodiment, any DNS components and resource cache components of CDN 108 are considered to be logically grouped, regardless of whether the components, or portions of the components, are physically separate. Additionally, the edge devices 106a-106c in PoPs will be geographically distributed throughout CDN 108 in a manner to best serve various demographics of client devices 102a-102g. Additionally, one skilled in the relevant art will appreciate that CDN 108 can be associated with various additional computing resources, such as additional computing devices for administration of content and resources, and the like.

In several embodiments, each edge device 106 in CDN 108 includes machine learning ("ML") engine modules 112a-112c which are configured to intercept requests originating from client devices 102a-102g, extract relevant content associated with client devices 102a-102g, and provide dynamic content that is customized for the users. In one example, client device 102a submits a request to edge device 106b to fetch a web page stored by origin server 104 of the content provider. In one example, ML engine 112b may receive a request from client device 102a and determines one or more tags from content accessed by client device 102a through edge device 106b of CDN 108. Once the tags are determined, ML engine 112b may apply a clustering algorithm to assign user identifier of client device 102a to a cluster that includes other user identifiers that have overlapping tags. In several embodiments, clustering analyses undertaken by edge devices 106a-106c may include one or more of nearest neighbor search, a k-nearest neighbor search, a Bayesian network/Bayesian inference, heuristic analysis, frequentist analysis/inference, k-means clustering, closest neighbor binary clustering, hierarchical clustering (either agglomerative or divisive), HCS (highly connected subgraphs) clustering, or other types of cluster analysis techniques to determine clusters based on the tags associated with each user identifier. Once the cluster is determined, ML engine 112b may select a set of relevant data objects that can enable the edge device 106b to dynamically embed the selected data objects into the response which is transmitted back to client device 102a. In another embodiment, the selected data objects can be the response itself or may transform the graphic user interface of the response, so as to customize dynamic content for client device 102a. As described further herein below, aspects of the present invention include ML engines 112 which reside in edge devices 106a-106c of CDN 108 which enable content providers to distribute dynamic content to users while reducing network latency.

In one embodiment, ML engine modules 112a-112c are deployed in edge devices 106a-c of CDN 108 by associating each edge device with one or more application servers (not shown) that store ML engine modules 112a-112c and perform machine learning algorithms with content cached in edge devices 106a-c serving as input. In this embodiment, a dedicated physical or virtual server may be assigned to operate in the PoP. In one implementation, as clients 102a-g interact with CDN 108 to access content, the data that is frequently being accessed by such clients may be cached in edge devices 106a-c, at which the application servers may access the data in the cache to use it as training data to construct the machine learning models for each edge device 106a, 106b, or 106c. In another implementation, the application servers storing ML engine modules 112a-112c may obtain a series of keywords from content (e.g., web pages) accessed by clients 102a-g through CDN 108 and use ML engine modules 112a-112c to build the machine learning model for each edge device 106a, 106b, or 106c. By providing dedicated application servers that perform machine learning operations for each edge location, edge devices 106a-c in CDN 108 may continue perform their ordinary operations while achieving better availability, reduced network latency, and more accurate up-to-date machine learning models to be configured.

In another embodiment, ML engine modules 112a-112c are deployed in edge devices 106a-c of CDN 108 by instantiating virtual machine instances in edge devices 106a-c and designating them as ML engine modules 112a-c. In this embodiment, virtual machine instances designated as ML engine modules may use the content stored in cache of edge devices 106a-c as training data to build the machine learning models. In some implementations of this embodiment, a plurality of virtual machine instances may operate together to build machine learning models for a single edge device (e.g., edge device 106a) of a particular Point of Presence. In another implementation, the virtual machine instances can be scaled up or down depending on network traffic occurring through the edge device. For example, if significant network traffic occurs in a first PoP, a virtual infrastructure manager located in CDN 108 may increase the number of virtual machine instances that execute machine learning algorithms to enable more responsive and robust machine learning models to be generated to serve clients at a particular edge location. Although virtual machine instances operating as ML engine modules 112a-c may share computing resources of edge devices 106a-c, the configurations enable a CDN provider to scale its dynamic content operations and consequently reduce total network costs while generating more up-to-date, responsive machine learning models compared to other machine learning models generated in a central server.

In yet another embodiment, ML engine modules 112a-112c are deployed in edge devices 106a-c of CDN 108 by executing one or more serverless compute functions associated with machine learning algorithms. In one implementation of the embodiment, machine learning algorithms stored in edge devices 106a-c may be triggered by one or more serverless compute functions based on a trigger event. For example, an event may be triggered by a user accessing resources cached in edge devices 106a-c such as a plurality of image files to be rendered in a requested web page. In response, serverless compute functions may assign the resources and/or corresponding metadata as training data for machine learning algorithms in building machine learning models in an edge location. In several embodiments, trigger events may include user activity through CDN 108, a central data store providing training data, user accessing content that is not cached in edge devices, etc. Because serverless compute functions generate and update machine learning models synchronously to user activities and other events, the machine learning models are constructed in a manner that is highly relevant to user activities. As a result, providing machine learning models through serverless compute functions allow content providers to provide personalized content to users that are highly relevant and synchronous to recent user activity.

Figure 2:
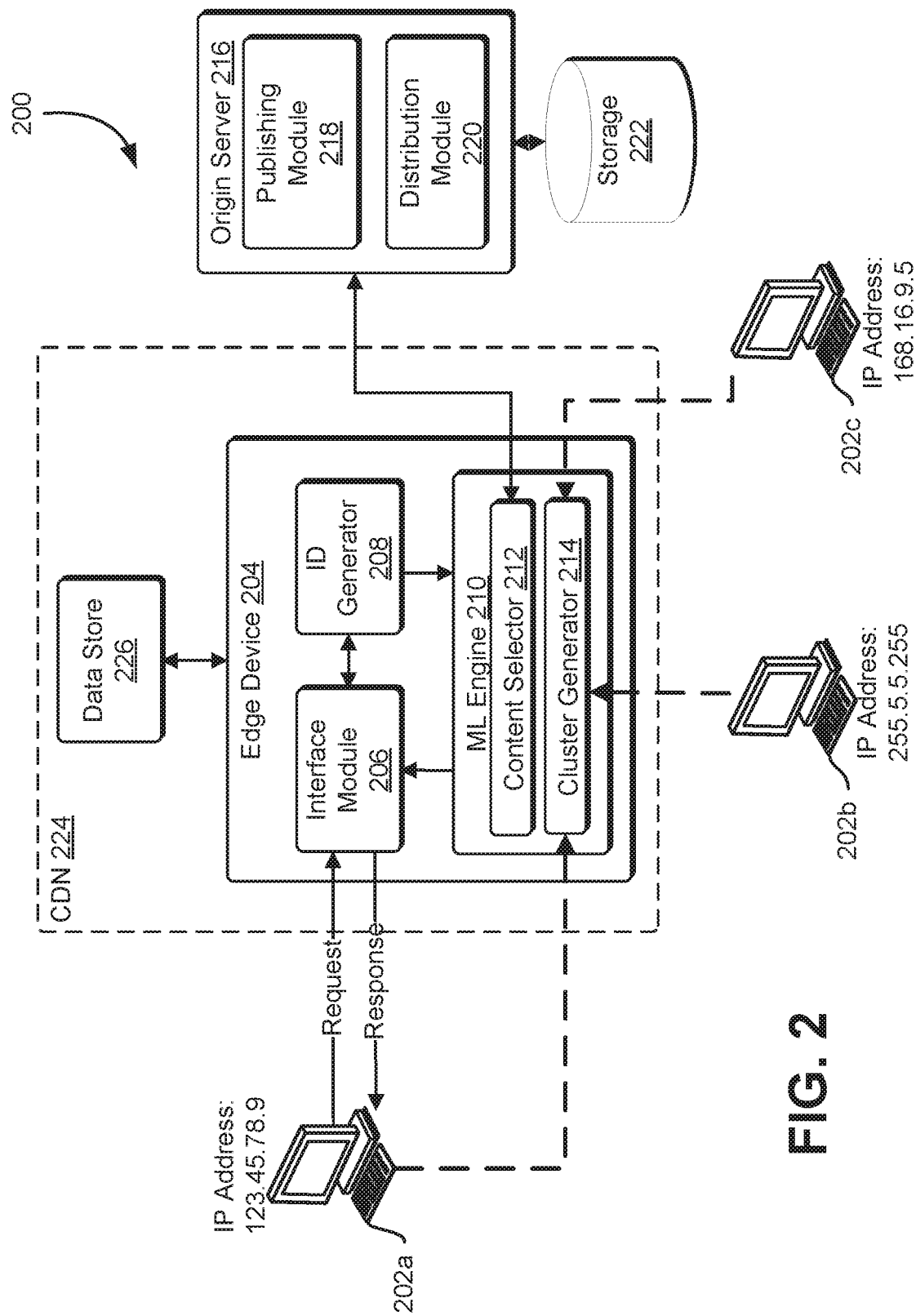
FIG. 2 illustrates an example diagram of a data processing environment that implements an edge device of the content delivery network implementing machine learning algorithms in accordance with an embodiment.

FIG. 2 illustrates an example diagram of a data processing environment 200 that implements an edge device 204 of the content delivery network 224 implementing machine learning algorithms in accordance with an embodiment. Data processing environment 200 includes client devices 202a-c connected to edge device 204 of CDN 224. Edge device 204 of CDN 224 includes interface module 206, ID generator 208, and ML engine module 210. ML engine module 210 further includes content selector 212 and cluster generator 214. Data processing environment 200 also includes origin server 216 which includes publishing module 218 and distribution module 220. Origin server 216 may communicate with storage component 222 to obtain content to be transmitted to edge devices in CDN 224. CDN 224 may be CDN 108 discussed in accordance with FIG. 1.

A user expresses his or her preferences by using client device 202a to visit one or more pages through a point of presence in CDN 224. In one embodiment, interface module 206 of edge device 204 receives web page requests submitted by client device 202a and records pages visited by the user. Based on this input, ML engine module 210 may infer user's navigated content in the order of relevance. For example, ML engine module 210 may determine the following set of keywords based on web pages navigated by client device 202a: football player ratings, football apparel, sport apparel, football rankings, football jersey sales, and clearance football items. Based on the recorded pages, the edge device may obtain content affinity for the user such as "football" followed by "apparel" which can then be set as one or more keywords associated with the user of client device 202a.

ID generator 208 then determines an identifier of the user of client device 202a. In one embodiment, determining the identifier may include designating the identifier with the IP address from which request was transmitted. In this example, since the request was originated from client device 202a, the identifier as determined by ID generator 208 will be "123.45.78.9." In another embodiment, ID generator 208 can determine the user identifier based on configuring the IP address of the user (in this example, 123.45.78.9) and cookies obtained from one or more applications of client device 202a. In embodiments in which the identifier does not exist, ID generator 208 may generate a unique ID based on the IP address of client device 202a and/or the cookies obtained from one or more applications running in client device 202a.

For each page visited, ID generator 208 obtains one or more keywords as described above then selects a one or more tags that can be associated with the user identifier for client device 202a. As illustrated herein, the tags of the user identifier can be viewed as an approximate representation of the user's interest in the corresponding domains. Thereafter, ID generator 208 provides the user identifier and its associated tags to ML engine module 210 of edge device 204.

When ML engine module 210 receives the user identifier and its tags, cluster generator 214 determines a cluster comprising other user identifiers provided by other client devices, in which the user identifiers of the cluster are associated with tags similar to the tags for the user as provided by ID generator 208. In other words, cluster generator 214 matches this user's preferred content against other users' and adds the user to a cluster of users who have "similar" tastes. In embodiments where a user identifier already exists in a cluster, cluster generator 214 selects the cluster that includes the user identifier provided by ID generator 208. Referring to the above example, cluster generator 214 may associate a user to a cluster of other users who have strong affinity for "football."

In several embodiments, for each formed cluster, cluster generator 214 generates a list of tags in order of relevance to the content preferred by the users of such cluster. Referring to the above example, cluster generator 214 may generate one or more tags related to "football" which may include the following tags ranked from highest relevance: football, football merchandise, and sport apparel. After cluster and tag formation has been completed, edge device 204 may use the clusters to determine dynamic content customized for a user. In other embodiments, edge device 204 may store the cluster in storage or a data store for later retrieval.

In one embodiment, ML engine module 210 may receive training data from a centralized data store 226 in addition to data from client 202a. By receiving such data from centralized data store 226, ML engine module 210 may generate clusters or other types of machine learning models that are more accurate. In some embodiments, training data from centralized data store 226 may be provided to ML engine module 210 asynchronously from any activities occurring at an edge location of CDN 224. In this manner, machine learning cluster generation process does not interfere or compete for resources that are being used by edge device 204. Moreover, centralized data store 226 may pull training data gathered by edge device 204 so as to synchronize such training data with other edge devices (e.g., edge device 106c of FIG. 1) of CDN 224. The synchronization of training data may increase the consistency of determining highly relevant data objects for the user even when such user moves through different edge locations.

Asynchronous from the cluster formation, origin server 216 may provide a plurality data objects which can be dynamically distributed to client device 202a. Origin server 216 may include publishing module 218 which provides static or dynamic content that was generated by the content provider. In addition, origin server 216 may include distribution module which obtains and distributes a plurality of data objects from other content providers that can be displayed in conjunction with content provided by publishing module. For example, a data object provided by distribution module 220 may be a football apparel advertisement of an apparel provider. In several embodiments, each data object provided by distribution module 220 includes metadata, such as tags associated with content associated with the data object. Origin server 216 may aggregate content generated by publishing module 218 and distribution module 220 and push the content (e.g., data objects) to edge device 204, which may in turn cache such content for distribution to client devices in CDN 200. For example, distribution module 220 may include a set of data objects such as multimedia advertisement objects involving football, football shoes, and football merchandise. In one embodiment, origin server 216 may push the content during predetermined time intervals, such as every three hours.

Once edge device 204 receives the data objects from origin server 216 through CDN 224, content selector 212 of ML engine module module 210 calculates a relevance score for each data object in order to determine the relevance of such data object to each cluster. In another embodiment, edge device 204 may detect that a user is accessing CDN 224 through edge device 204, selects the cluster for which the user has the strongest affinity, then provides such cluster to content selector 212. In turn, content selector 212 generates a list of data objects relevant to such cluster, in which relevance scores are calculated for the data objects in the list. In several embodiments, the relevance score are determined based on applying machine learning algorithms to identify similarity between tags of the cluster and tags of each data object. In some embodiments, the relevance scores for each data object can be normalized and scaled between 0 and 1 (e.g., 0.65, 0.25). Referring to the above example, content selector 212 may determine relevance score for the obtained data objects in view of the selected cluster as follows: "football shoes"→0.95; "football"→0.65; and "football merchandise"→0.25.

After the relevance scores are determined for each data object, content selector 212 may select the data object(s) with highest relevance scores and provide such data object to client device 202a through interface module 206. The data object may be provided with the request submitted by the user, which can be displayed in one or more regions of the request web page. In some embodiments, the data objects can be a set of graphic objects which may transform the web page display catered to user's interests.

Figure 3:
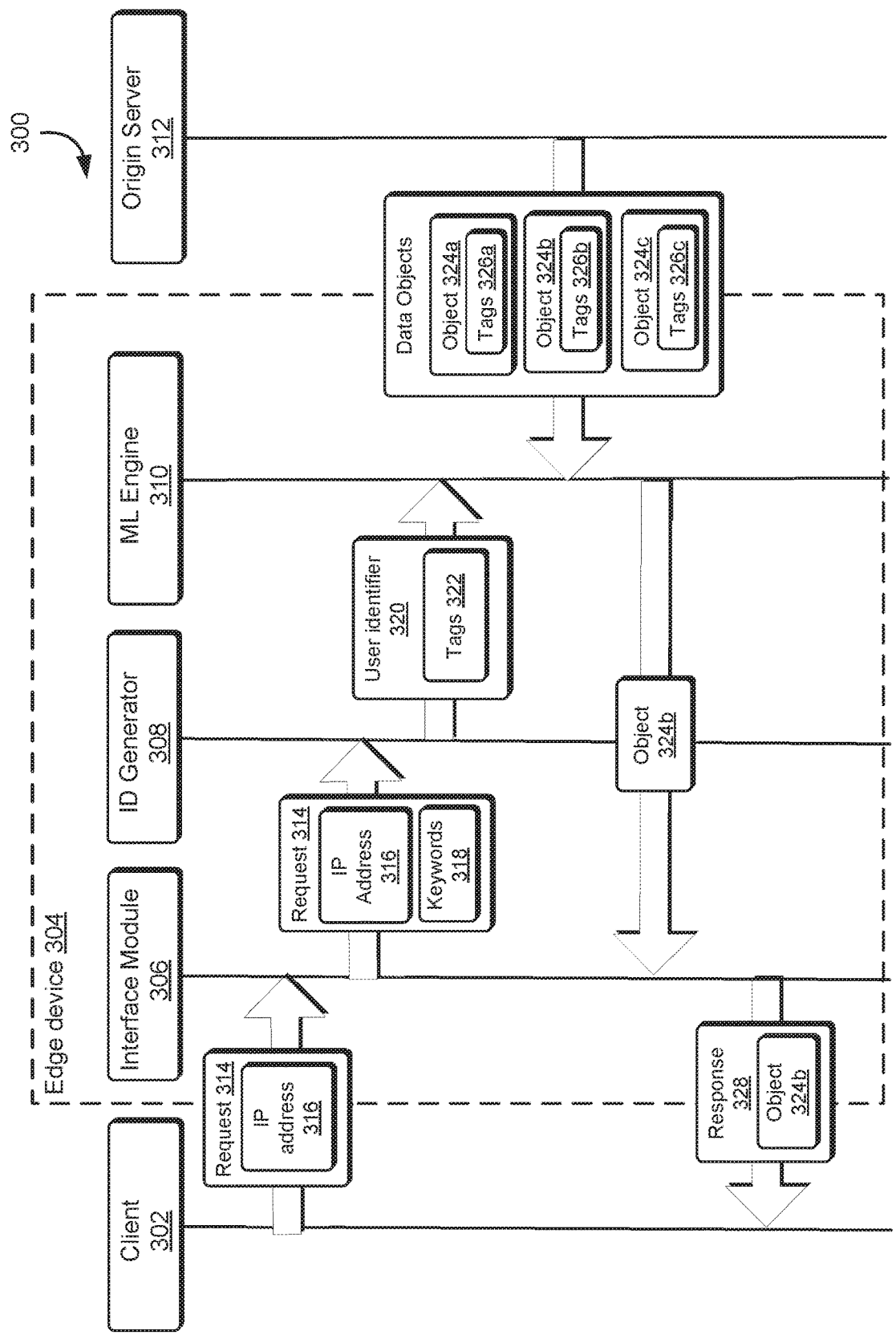
FIG. 3 illustrates an example sequence diagram for providing data objects generated based on machine learning models of an edge device in accordance with an embodiment.

FIG. 3 illustrates an example sequence diagram 300 for providing data objects generated based on machine learning models of an edge device in accordance with an embodiment. In several embodiments, client 302, which may be client device 202a of FIG. 2, edge device 304 may be edge device 204 of FIG. 2, interface module 306 may be interface module 206 of FIG. 2, ID generator 308 may be ID generator 208 of FIG. 2, ML engine module 310 may be ML engine module 210 of FIG. 2, and origin server 312 may be origin server 216 of FIG. 2.

With reference to FIG. 3, client 302 generates request 314 that includes IP address 316 and submits request 314 to edge device 304 of a content delivery network. Interface module 306 of edge device 304 receives request 314 and identifies one or more keywords 318 associated with request 314. In some embodiments, interface module 306 may identify additional keywords based on other content accessed by client 302 through edge device 304. After the keywords 318 are identified, interface module 306 provides request 314 that includes IP address 316 and keywords 318 to ID generator 308.

ID generator receives request 314 with IP address 316 and keywords 318 and identifies user identifier 320 of client 302. In this embodiment, the unique user identifier can be the IP address 316, though in other embodiments ID generator may use IP address 316 and other data of the user to generate a separate unique ID. In addition, ID generator may use keywords 318 to identify tags 322 that may represent content that would be most to client 302. After the user identifier and tags are determined, ID generator provides them to ML engine module 310 for further processing.

ML engine module 310 receives user identifier 320 and tags 322 and associated the user identifier 320 with a cluster (not shown) that has most similarity to tags 322. ML engine module 310 may also generate another set of tags for the cluster, based on the tags of the associated user identifiers. Furthermore, ML engine module 310 receives a plurality of data objects 324a-324c, each of which is also associated with tags 326a-326c, respectively. In several embodiments, ML engine module 310 compares the tags of the cluster with tags 326a-326c of data objects 324a-324c and determines that object 324b is most relevant to the cluster. After object 324b is selected, ML engine module 310 removes tags 326b from object 324b and transmits object 324b to interface module 306. Interface module 306 then fetches response 328 to request 314, embeds object 324b into response 328, and transmits response 328 back to client 302.

Figure 4:
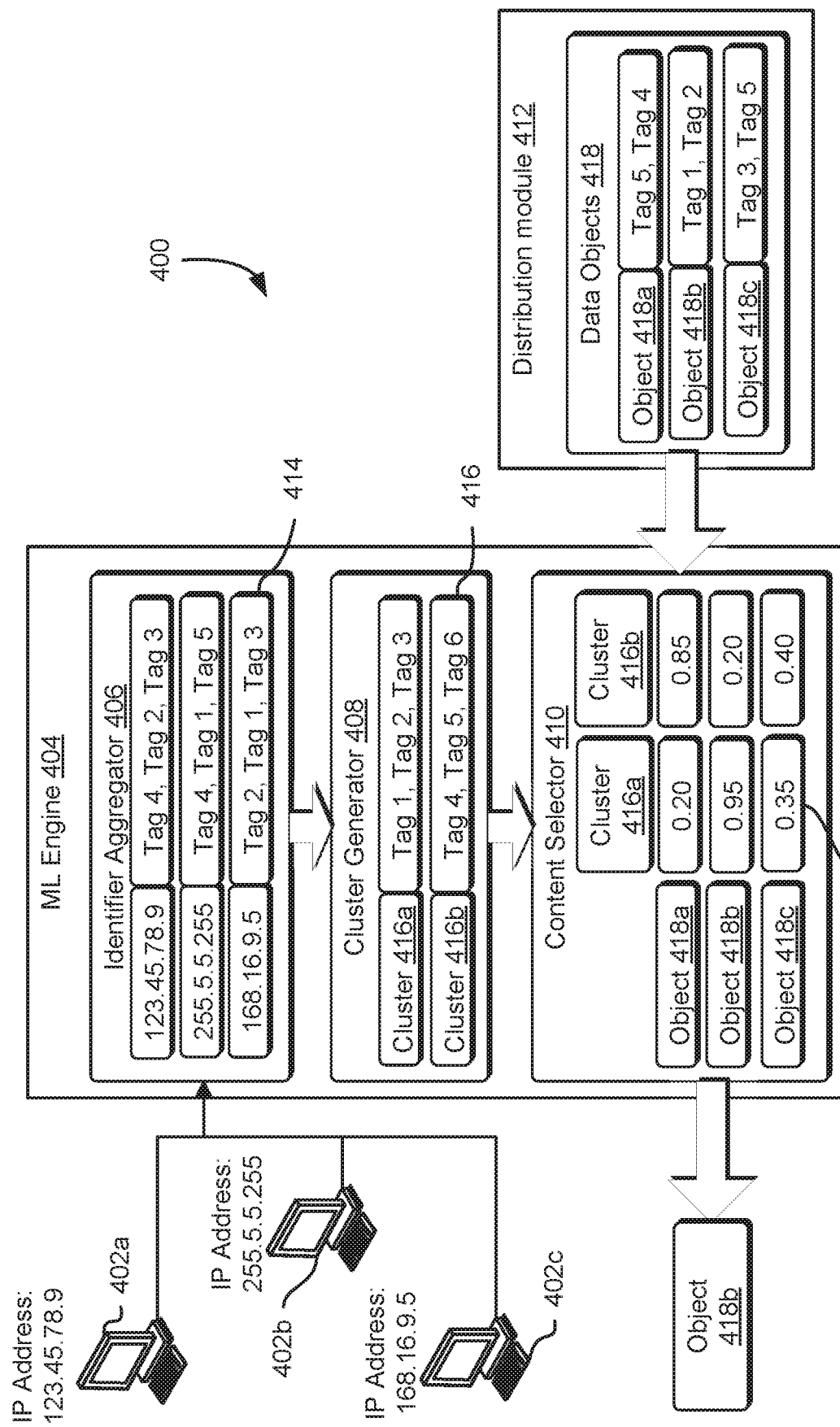
FIG. 4 illustrates an example configuration of a machine learning engine of an edge device in accordance with an embodiment.

FIG. 4 illustrates an example configuration 400 of a machine learning engine 404 of an edge device in accordance with an embodiment. Clients 402a-402c may be clients 202a-202c of FIG. 2. ML engine module 404 may be ML engine module 210 of FIG. 2. Cluster generator 408 may be cluster generator 214 of FIG. 2, and content selector 410 may be content selector 212 of FIG. 2. Distribution module 412 may be distribution module 220 of origin server 216 of FIG. 2.

Identifier aggregator 406 obtains information from clients 402a-402c and determines identifiers and their associated tags. In several embodiments, identifier aggregator 406 stores the plurality of identifiers and associated tags 414. Once all identifiers are aggregated, Cluster generator 408 determines a group of user identifiers that include similar tags, which can be determined based on the similarity between the tags of the user identifiers. In some embodiments, the tags are converted into the spatial coordinates in a graph, in which the set of coordinates for each tag can be derived from the tag's Levenshtein distance from random words that serve as centroids for a set of clusters. Once the graph of the user identifiers are generated, Cluster generator 408 may demarcate the bounds of the cluster so as to group user identifiers that are plotted closely together. After the clusters are created, cluster generator 408 determines one or more tags for each generated cluster. In one embodiment, the tags for each generated cluster can be determined based on highest frequency of tags appearing in the group of identifiers. Cluster generator 408 then forms a cluster that represents a group of user identifiers that are associated with tags that includes strong affinity towards each other. As shown, clusters 416 include cluster 416a which includes set of tags represented as "Tag 1," "Tag 2," and "Tag 3" and cluster 416b which includes another set of tags represented as "Tag 4," "Tag 5," and "Tag 6."

In addition to generating clusters 416, ML engine module 404 obtains data objects 418 from Distribution module 412. As provided in FIG. 4, data objects 418 may include a plurality of data objects (e.g., text, multimedia files, code snippets), each of which being assigned with its own set of tags. Content selector 410 of ML engine module 404 then obtains data objects 418a-c and clusters 416a-b to calculate relevance scores 420 for each data object corresponding to each cluster. In the illustrative example, object 418b is indicated with the highest score for cluster 416a. If the request is submitted from client 402c having an IP address specified at 168.16.9.5, Cluster generator 408 may designate client 402c with cluster 416a. In response, content selector selects object 418b to be provided with the response requested by client 402c. Conversely, if client 402b submitted the request, cluster 416b will be selected by content selector 410 which will result with object 418a to be provided as response. In several embodiments, the relevance scores 420 may be applied with exponential decaying factors to normalize the data objects. For example, if object 418c was generated at a time significantly before the other data objects (e.g., multimedia files based on 2014 World Cup), the exponential decay factor is applied to affect the relevance score of object 418c.

Figure 5A:
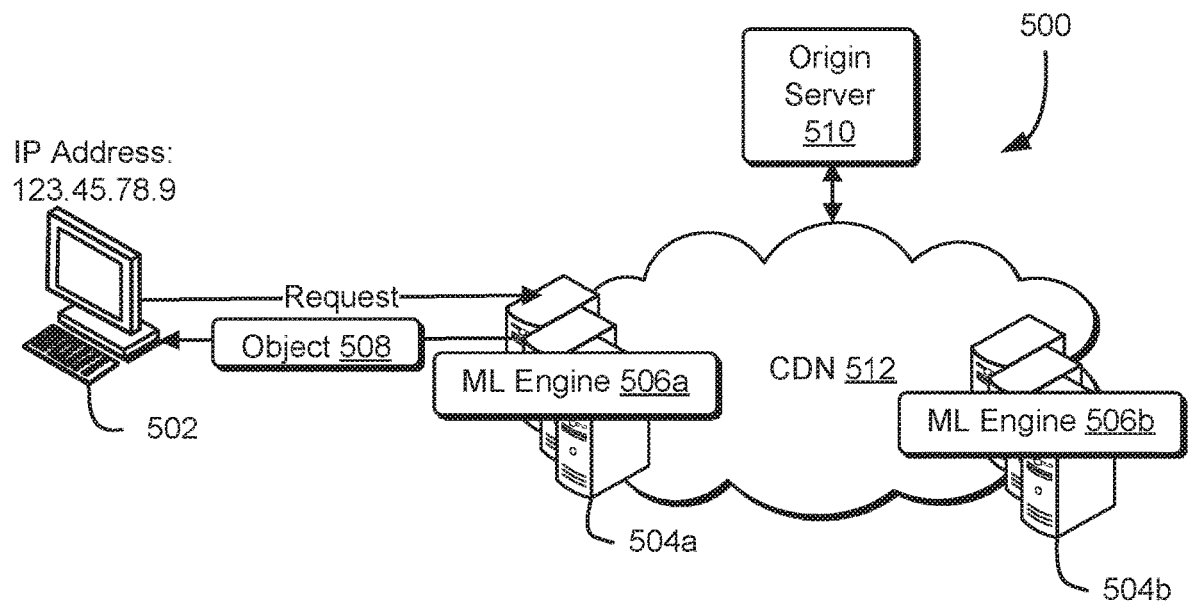
FIGS. 5A and 5B illustrate example configurations of providing data objects based on location of the user utilizing the content delivery network in accordance with an embodiment.
Figure 5B:
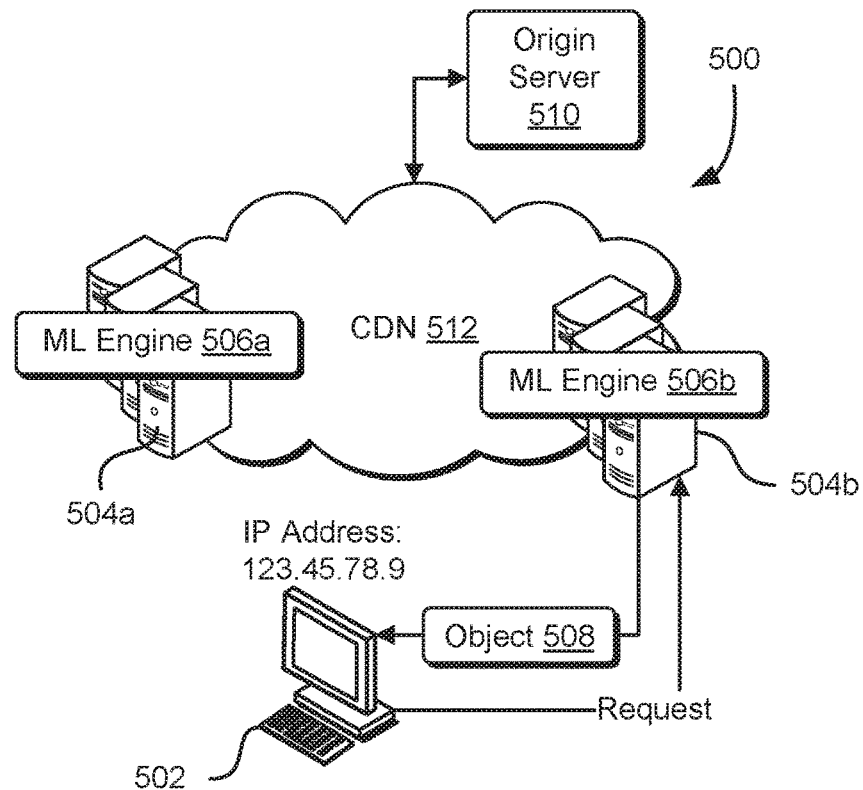

FIGS. 5A and 5B illustrate example configurations of providing data objects based on location of the user utilizing the content delivery network 512 in accordance with an embodiment. FIG. 5A illustrates data processing environment 500 in which client 502 accesses content in CDN 512 via edge device 504a. In embodiments, edge devices 504a and 504b includes ML engines 506a and 506b respectively, where ML engines 506a and 506b determines dynamic content that can be customized to user's interests and activities. For instance, client 502 can be associated with IP address "123.45.78.9," and once client 502 submits a request to CDN 512, edge device 504a may return a data object, e.g., object 508, selected by ML engine 506a based on content viewed by the user through its previous browsing activities. In several embodiments, data processing environment 500 includes origin server 510 which pushes a plurality of data objects to edge devices 504a and 504b in CDN 512, to enable edge devices 506a-b to dynamically select the data objects based on results generated by their corresponding ML engines.

FIG. 5B illustrates another configuration of data processing environment 500 in which client 502 has relocated to another location covered by edge device 504b of CDN 512. In this embodiment, because the previous activities of client 502 recorded by edge device 504b are different from those by edge device 504a, ML engine 506b may generates a different set of data objects such as object 508 in response to the same request submitted by client 502. Because the ML engines reside on the edge devices and are not shared throughout CDN 512, the dynamically selected data objects may differ based on the PoPs that are accessed by the users. Therefore, aspects of the present invention not only improve network speeds on machine learning algorithm responses, but also enable content providers to further customized content across different PoPs.

Figure 6A:
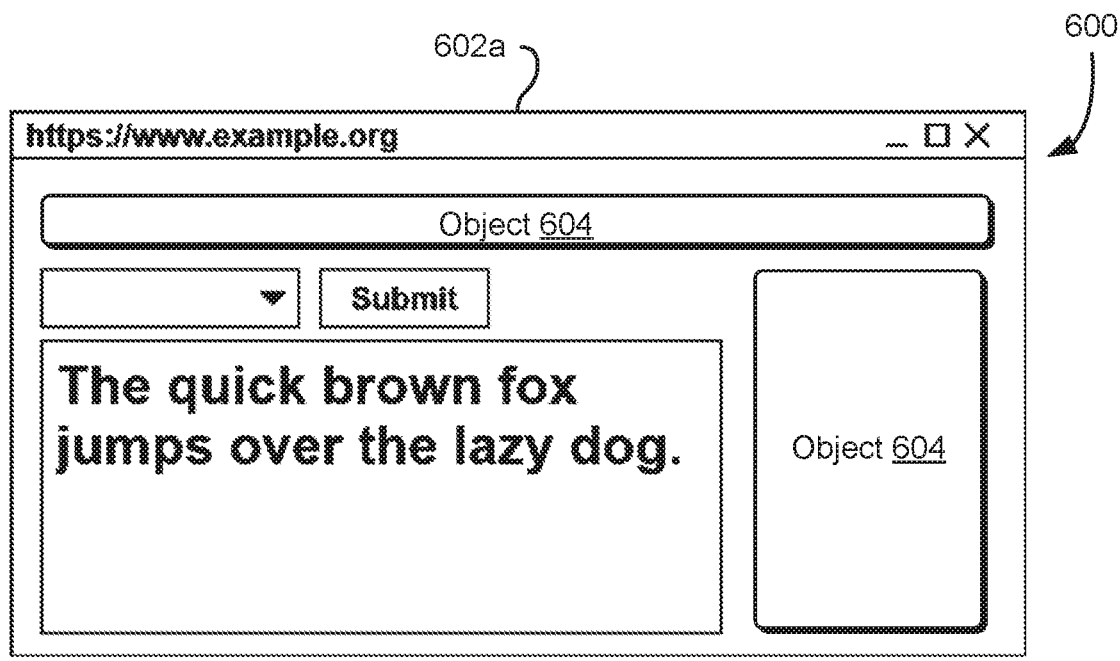
FIGS. 6A and 6B illustrate example configurations of a web browser displaying the data objects generated based on machine learning models of an edge device in accordance with an embodiment.
Figure 6B:
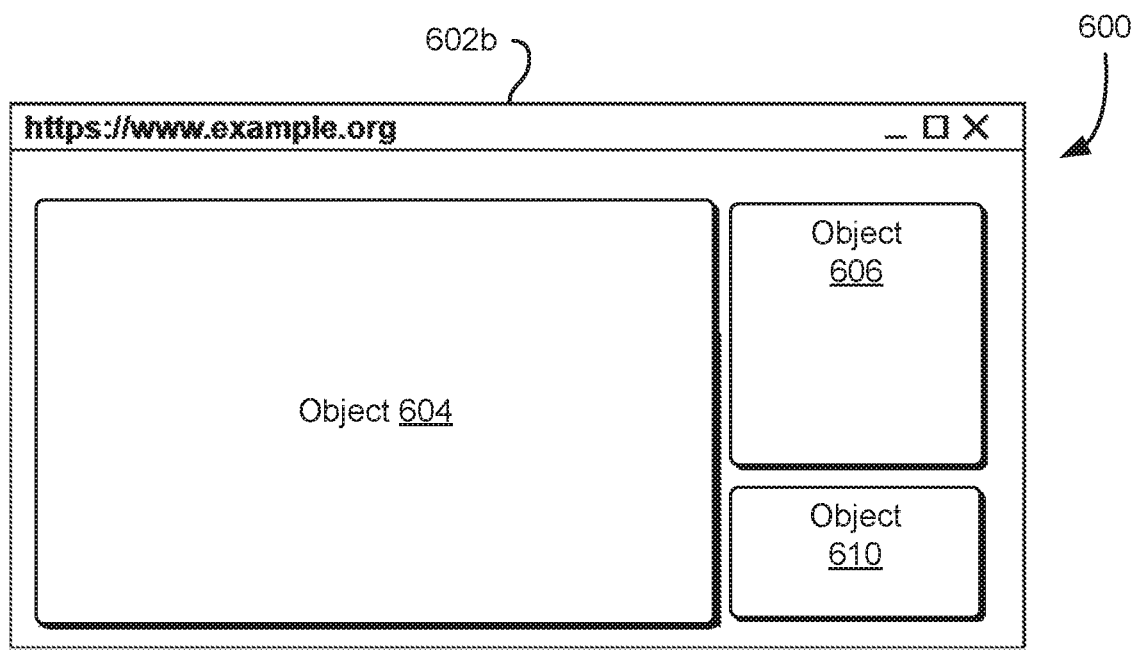

FIGS. 6A and 6B illustrate example configurations of a web browser displaying the data objects generated based on machine learning models of an edge device in accordance with an embodiment. FIG. 6A illustrates browser 600 which display web page 602a that was generated in response to a request submitted by a user. In this example, the request submitted by a user is to fetch a web page with a URL named "https://www.example.org." In one embodiment, web page 602a displays static content which includes a drop down menu with a text section providing the phrase "The quick brown fox jumps over the lazy dog." In addition to the static content, web page 602a includes one or more regions in which dynamic content are displayed on browser 600. For example, a first smaller region in web page 602a may display object 604, and a second larger region may also display object 604. In some embodiments, the one or more regions in web page may be encoded with a script provided by the CDN to allow dynamic content to be displayed based on the user's preferences.

FIG. 6B illustrates browser 600 which display web page 602b that was generated in response to another request submitted by a user. Similar to the previous example, the request submitted by a user is to fetch a web page with a URL named "https://www.example.org." However, web page 602b includes no static content, but provides three regions in which dynamic content is displayed on browser 600, including object 604, object 606, and object 610. In some embodiments, each region of web page 602*b* may display a data object, e.g., object 604, based on its degree of relevance to the user requesting the web page 602*b*. In this example, web page 602*b* provides object 604 in the largest region because object 604 was determined as having the highest relevance score. By contrast, web page 602*b* displays object 610 in the smallest region, because object 610 was determined to include the lowest relevance score. In several embodiments, aspects of present invention are not limited to web pages, but also different types of application interfaces. For instance, aspects of the present invention may illustrate a social media application with relevant dynamic content presented in response to the user request to load the home screen. Accordingly, aspects of the present invention is advantageous from the conventional systems since application graphic user interfaces can be transformed and customized based on preferences and previous activities performed by the user while maintaining optimal network response time as the processing is performed at the edge device level.

Figure 7:
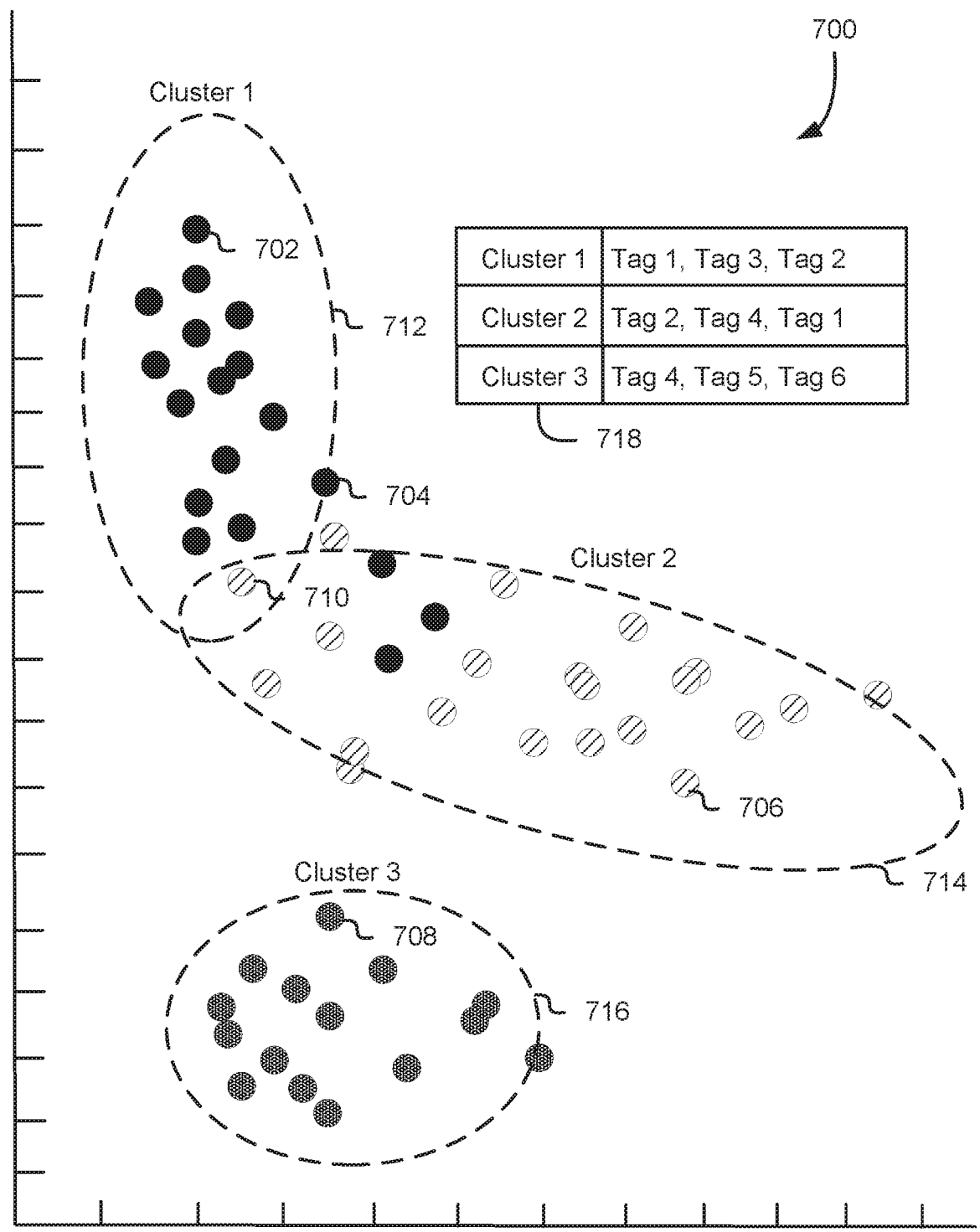
FIG. 7 illustrates an example diagram of clustering user identifiers through the use of machine learning engine of an edge device in accordance with an embodiment.

FIG. 7 illustrates an example diagram of clustering user identifiers through the use of machine learning engine of an edge device in accordance with an embodiment. Graph 700 illustrates a two-dimensional visualization of user identifiers that are clustered based on similar contents. User identifiers 702, 704, 706, 708, and 710 are illustrated as data points plotted on graph 700. In some embodiments, each of the user identifiers 702, 704, 706, 708, and 710 can be uniquely identified based on its IDs or IP addresses. In addition, as illustrated in FIG. 7, the user identifiers are plotted in a manner that the user identifiers indicate having similar content may be placed near to each other. For example, user identifiers 702 and 704 indicate that the tags associated with user identifiers 702 and 704 are similar as compared to the tags of user identifiers 706 and 708. In some embodiments, because the user identifiers include tags are not typically provided as numerical values, the edge server may transform the character values of the tags into graph coordinates. In several embodiments, clustering analyses undertaken by the edge device may include one or more of nearest neighbor search, a k-nearest neighbor search, a Bayesian network/Bayesian inference, heuristic analysis, frequentist analysis/inference, k-means clustering, closest neighbor binary clustering, hierarchical clustering (either agglomerative or divisive), HCS (highly connected subgraphs) clustering, or other types of cluster analysis techniques to determine clusters based on the tags associated with each user identifier. In implementations where the clustering analysis does not use a deterministic approach during generation of graph 700, different probabilistic approaches may be implemented in parallel, and a meta-analysis of the outcomes of the different probabilistic approaches may be performed to determine the user identifier clusters that are most likely to be correct.

The aggregation of user identifiers demonstrates a pattern of clusters 712, 714, and 716, in which each cluster may represent one or more user identifiers, such as cluster 712 representing 702 and 704, cluster 714 representing user identifiers 706 and 710, and cluster 716 representing 708. For example, user identifier 702 may be associated with tags "football" and "seahawks," while user identifier 704 may be associated with tags "seahawks" and "mariners." After applying the clustering algorithms, the edge server may obtain cluster 712 that represents both user identifiers 702 and 704. In some embodiments, clustering algorithms may identify a user identifier to be associated with two or more clusters. In this embodiment, clusters 712 and 714 represent user identifier 710.

Each of clusters 712, 714, and 716 may be associated with its own set of tags. As shown in table 718, cluster 712 is associated with "Tag 1," "Tag 3," and "Tag 2." In addition, cluster 714 is associated with "Tag 2," "Tag 4," and "Tag 1," while cluster 716 is associated with "Tag 4," "Tag 5," and "Tag 6." In several embodiments, a cluster (e.g., cluster 712) may be associated with at least one tag (e.g., "Tag 2") that is also associated with another cluster (e.g., cluster 714). In some embodiments, the tags of the clusters are selected from the tags of user identifiers and may be randomly ordered. In other embodiments, the tags of the clusters can be ranked based on the total number of tags being associated with the user identifiers. If the tags are ranked, weight factors can be assigned in accordance with the ranking of each tag of the cluster, and the weighted values of the tags can be used to determine the most relevant data object to be provided to the user whose identifiers is assigned to a particular tag.

Figure 8:
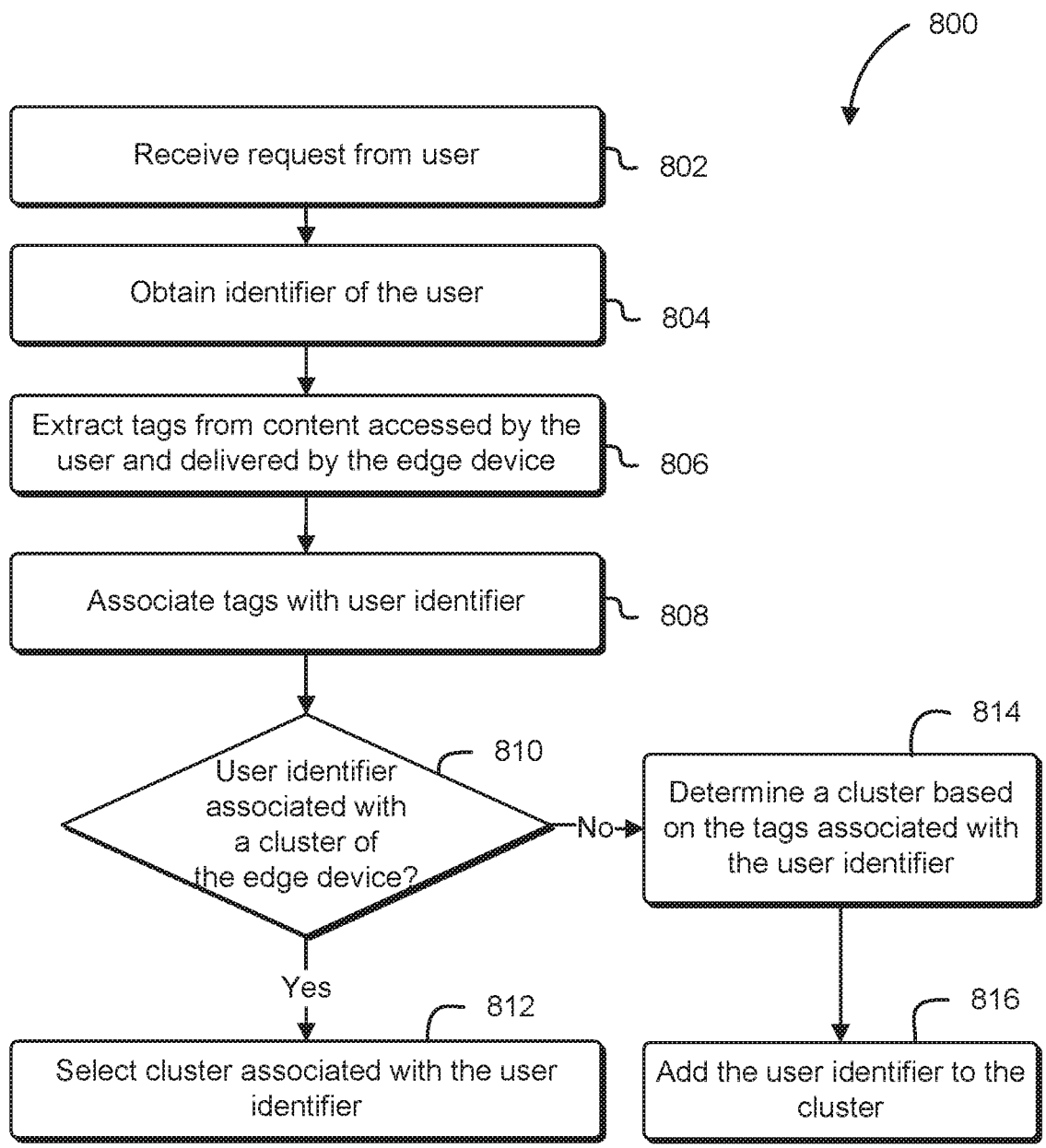
FIG. 8 illustrates an example flowchart for selecting a cluster based on user activities in the content delivery network in accordance with an embodiment.

FIG. 8 illustrates an example flowchart for selecting a cluster based on user activities in the content delivery network in accordance with an embodiment. The process 800 of FIG. 8 is initiated by an edge device of the content delivery network receiving a request from a user, such as fetching a web page in response to the request (step 802). The edge device then obtains an identifier of the user (step 804). In one embodiment, obtaining the identifier may include designating the identifier with the IP address from which request was transmitted. In another embodiment, the identifier can be determined based on configuring the IP address of the user and cookies obtained from the user's browser application as input. In embodiments in which the identifier does not exist, the edge device may generate a unique ID based on the IP address of the user and/or the cookies obtained from the user's application.

At step 806, the edge device extracts tags from content accessed by the user that were delivered by the edge device. In one embodiment, the edge device may record the web pages accessed by the user during a predetermined time interval, then generate a set of tags based on the content of the recorded web pages. In another embodiment, the edge device generates a set of tags based on types of applications that the user has used during a time period. For example, the edge device may generate sports-related tags if the applications being used by the user transmit API calls that request baseball statistics and football game score updates. In yet another embodiment, the edge device extracts tags from the content based on the URL requests submitted by the user, such as a search query that includes a set of keywords such as flowers and roses as part of the query's GET parameters. In another embodiment, the edge device may obtain the content from the web page response to the user request, identify one or more keywords from the content, and designate the one or more keywords as the tags. The edge device then associates the extracted tags with user identifier (step 808).

The edge device then determines whether the user identifier is associated with a ML cluster stored in the edge device (step 810). If it is determined that a cluster associated with the user identifier exists ("Yes" path from step 810), the edge device selects the identified cluster (step 812). Conversely, if it is determined that a cluster associated with the user identifier exists ("No" path from step 810), the edge device determines to which cluster the user identifier should be assigned (step 814). In one embodiment, the edge device determines the cluster based on the tags associated with the user identifier. More specifically, a cluster may include its own set of tags which can be compared with the tags of the user identifier. If similarity between tags of a cluster and the tags of the user identifier exceeds a threshold, the edge device selects the cluster to which the user identifier should be assigned. Once the cluster is determined, the edge device assigns the user identifier to such cluster (step 816). The process 800 terminates thereafter.

Figure 9:
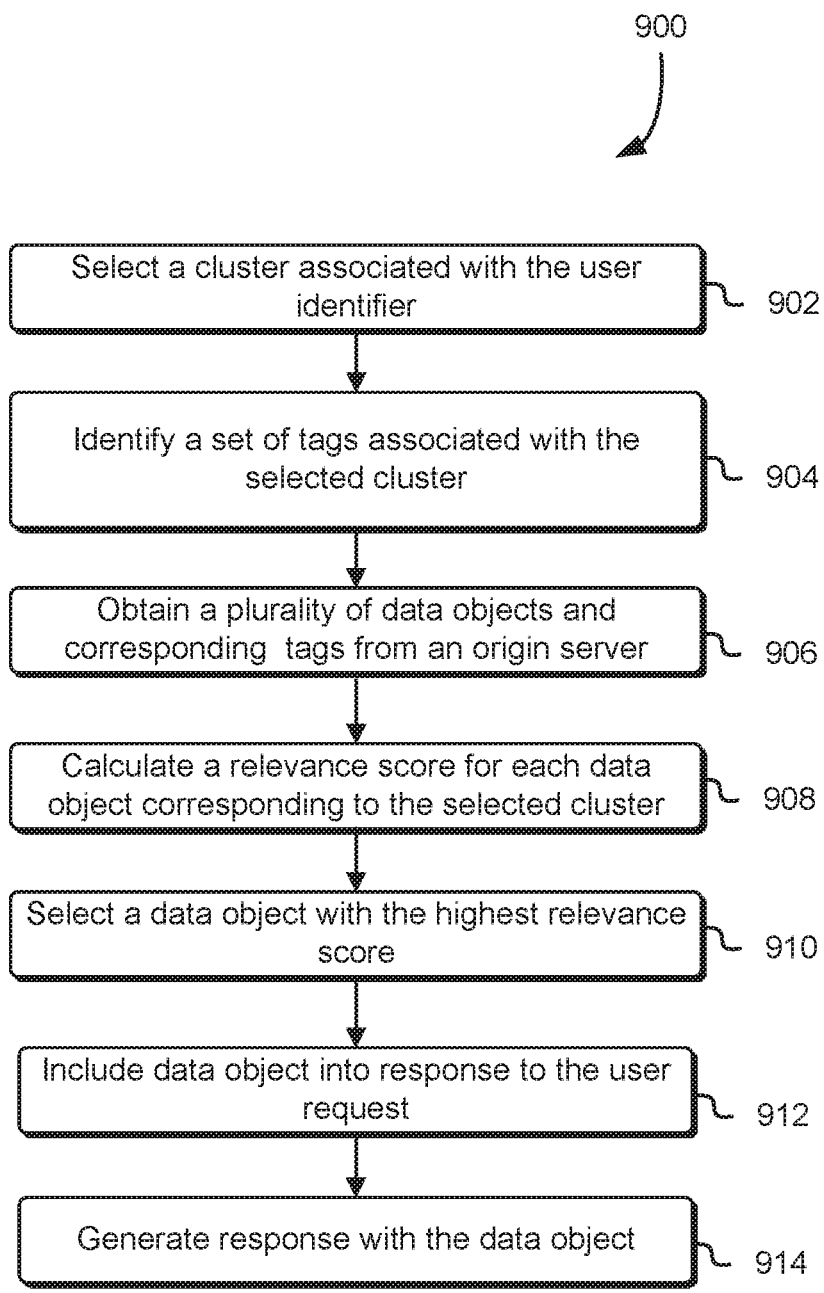
FIG. 9 illustrates an example flowchart for determining a data object provided by a content provider using machine learning algorithms in accordance with an embodiment.

FIG. 9 illustrates an example flowchart for determining a data object provided by a content provider using machine learning algorithms in accordance with an embodiment. The process 900 of FIG. 9 is initiated by an edge device selecting a cluster associated with the user identifier (step 902). Embodiments of selecting the cluster can be referred to the process provided in FIG. 8 above. At step 904, the edge device identifies a set of tags associated with the selected cluster. In one embodiment, selecting clusters and determining the associated set of tags are performed asynchronously from the other steps of process 900. In some embodiments, the set of tags can be generated for each cluster based on aggregating tags associated with a plurality of users and applying one or more machine learning algorithms to determine the most relevant set of tags for the selected cluster. At step 906, the edge device receives a plurality data objects (e.g., advertisements) from an origin server, in which each data object is associated with its own set of tags. In one embodiment, the data objects may be generated by the origin server of the content provider. Alternatively, the data objects may be provided to the origin server by third party providers, which are then cached in the edge device. In some embodiments, the data objects can be cached in the edge device at predetermined time intervals. Alternatively, the data objects can be cached in the edge device as a result of updated content being distributed by the origin server to the edge devices.

At step 908, the edge device calculates a relevance score for each cached data object that corresponds to the selected cluster. In one embodiment, the relevance score for each data object can be calculated by determining the similarity between the tags of the data object with the tags of the selected cluster. In one embodiment, the relevance score can be calculated based on how many tags of the data object match the tags of the selected cluster. In some embodiment, a machine learning algorithm can be applied in which the ML engine determines Levenshtein distance for each tag of the data object to the tags of the selected cluster. As referred to herein, the Levenshtein distance is the minimum number of single-character edits (insertions, deletions or substitutions) required to change the characters of the data object into the tags of the selected cluster. Thereafter, the relevance score for each data object can be generated as a function of Levenshtein distance of each tag of the data object. In yet another embodiment, the tags can be tokenized by the one or more natural language processing algorithms, and the tokens can be compared to the tags of the selected cluster to generate the relevance score.

At step 910, the edge device selects a data object with the highest relevance score. In one embodiment, the edge device may set a predetermined threshold value and selected one or more objects that have relevance scores exceeding the predetermined threshold value. In another embodiment, the edge device may select more than one data objects with highest relevance values based on a number of regions that can be displayed by a web page. For example, if a web page response includes three regions for displaying dynamic content, the edge device selects three data objects having the highest relevance scores. Once the data object(s) is selected, the edge device includes the data object into the response to user request (step 912). In some embodiments, the edge device implements a script coded in the region of the response to incorporate the data object within such region of the response. In other embodiments, the edge device parses the code elements of the response (e.g., <iframe>, <header>, <section>) and embeds a link in such elements, so as to allow the data objects to be overlaid on the regions of the response that correspond to the code elements. At step 914, the edge device provides the response with the data object in response to the user request. The process 900 terminates thereafter.

Figure 10:
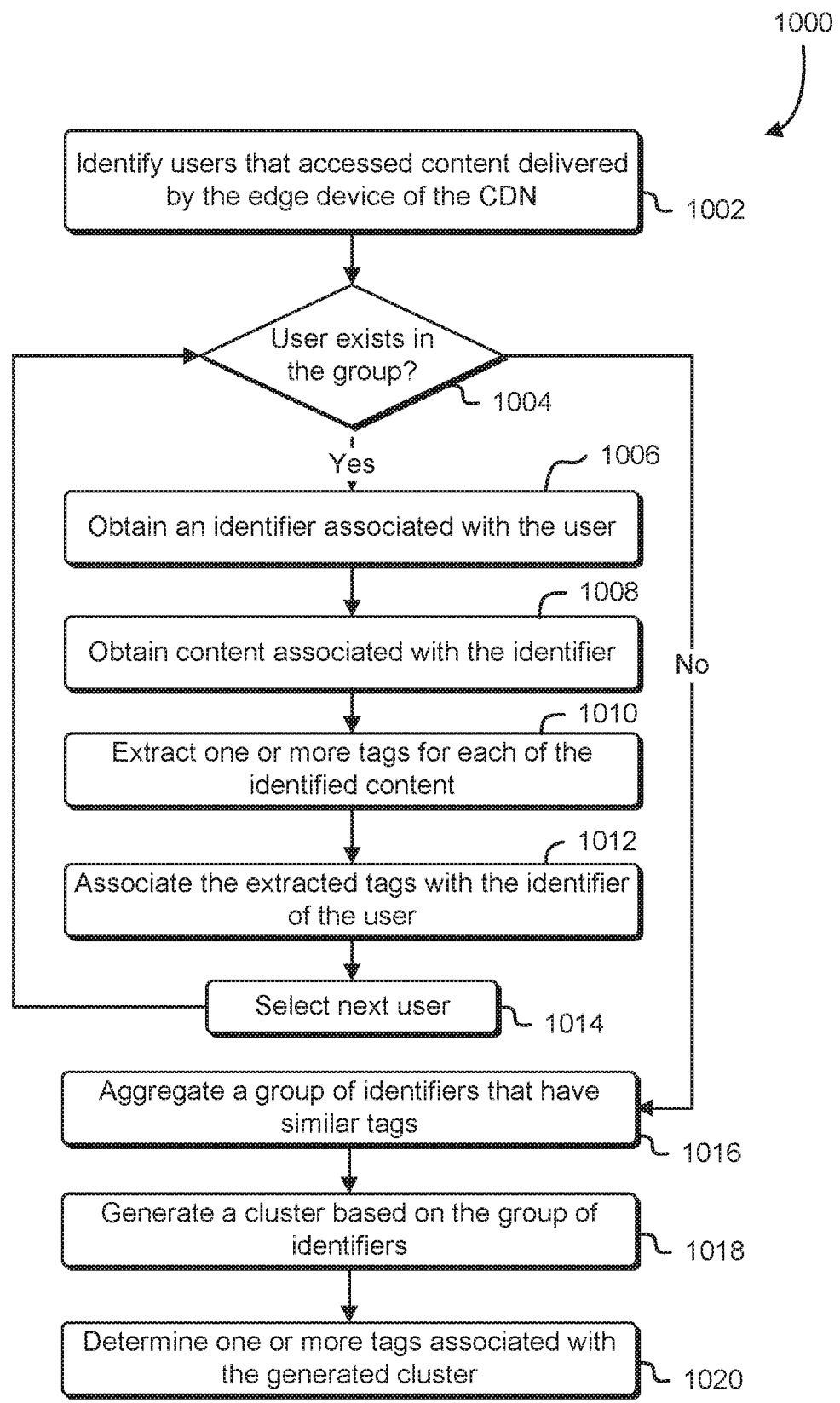
FIG. 10 illustrates an example flowchart for generating a cluster from a plurality of users in a content delivery network in accordance with an embodiment.

FIG. 10 illustrates an example flowchart for generating a cluster from a plurality of users in a content delivery network in accordance with an embodiment. The process 1000 of FIG. 10 is initiated by identifying users that accessed content delivered by the edge device of the CDN (step 1002). In one embodiment, all users that accessed one or more web pages that were provided the edge device can be identified. In some embodiments, the number of users can be constrained to the users who accessed the edge device in a predetermined time period. For each user in the group of users that accessed content delivered by the edge device (step 1004), the edge device obtains an identifier associated with the user (step 1006). In one embodiment, obtaining the identifier may include designating the identifier with the IP address from which request was transmitted. In another embodiment, the identifier can be determined based on configuring the IP address of the user and cookies obtained from the user's browser application as input. In embodiments in which the identifier does not exist, the edge device may generate a unique ID based on the IP address of the user and/or the cookies obtained from the user's application.

At step 1008, the edge device identifies content associated with the identifier, such one or more web pages previously accessed by the user and delivered by the edge device of the CDN. In another embodiment, the edge device identifies content based on types of applications that the user has used during a time period. For example, the edge device may determine that the content is sports-related if the applications being used by the user transmit API calls that request baseball statistics and football game score updates. In yet another embodiment, the edge device identifies content based on the URL request submitted by the user, such as a search query that includes a set of keywords such as flowers and roses as part of the query's GET parameters.

At step 1010, the edge device extracts tags from content accessed by each user. In one embodiment, the edge device may record the web pages accessed by the user during a predetermined time interval, then generate a set of tags based on the content being provided by the recorded web pages. In another embodiment, the edge device may obtain the content from the web page response to the user request, identify one or more keywords from the content, and designate the one or more keywords as the tags. The edge device then associates the extracted tags with user identifier (step 1012), and selects the next user to repeat the same process of associating tags to the user identifier (step 1014).

After all users in the group are associated with the tags, the edge device aggregates a group of user identifiers that include similar tags (step 1016). In one embodiment, the aggregation of user identifiers can be calculated by determining the similarity between the tags of the user identifiers. In some embodiments, the tags are converted into the spatial coordinates in a graph, in which the set of coordinates for each tag can be derived from the tag's Levenshtein distance from random words that serve as centroid of a number of clusters. Once the graph of the user identifiers are generated, the edge device may aggregate the group of user identifiers that are plotted closely together. At step 1018, the edge device generates a cluster that represents a group of user identifiers that are associated with tags that includes strong affinity towards each other.

Once the cluster(s) are generated, the edge device determines one or more tags for each generated cluster (step 1020). In one embodiment, the tags for each generated cluster can be determined based on tags of the group of identifiers appearing with the highest frequency. In several embodiments, the edge device may determine the number of tags that are assigned to each cluster, and the tags are ranked based on the frequency of the tags that appear in the group of user identifiers. The process 1000 terminates thereafter.

Figure 11:
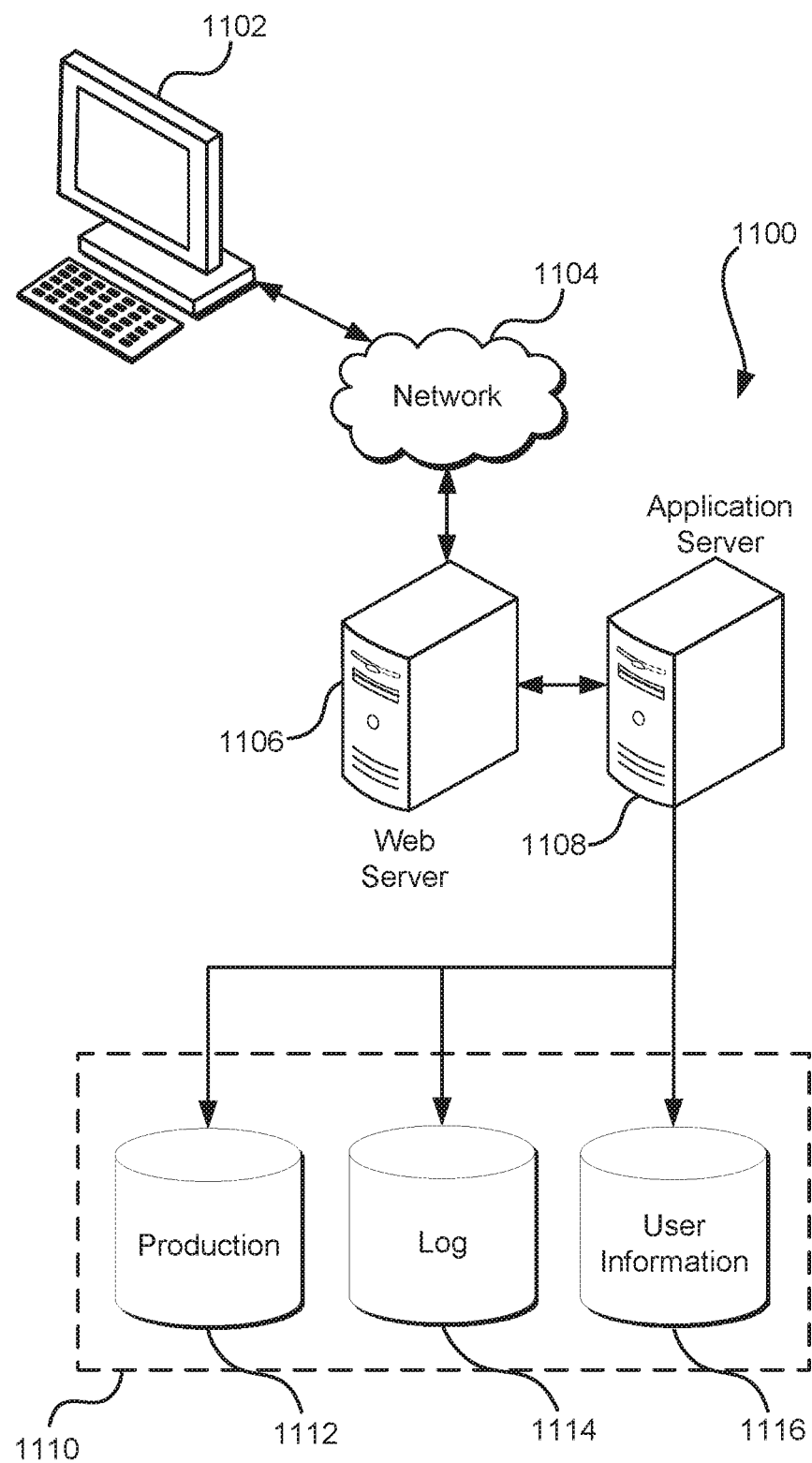
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto and the application server 1108 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining information based on content accessed by a user through an edge server of a content delivery network;
    associating, at the edge server, the user with other users based on the obtained information based on determining that the other users have accessed the content through the edge server;
    generating, at the edge server, a machine learning cluster based on executing one or more machine learning algorithms, the machine learning cluster comprising a plurality of nodes representative of the user and the associated other users;
    determining a first set of tags for the machine learning cluster, the first set of tags derived from a plurality of websites accessed by the user;
    obtaining a plurality of data objects, each data object of the plurality of data objects associated with another set of tags; and
    as a result of determining that at least one tag of a particular data object matches one or more tags of the machine learning cluster:
        selecting the particular data object; and
        causing one or more regions of a website to display the particular data object to the user.

2. The computer-implemented method of claim 1, wherein each node of the plurality of nodes further indicates a network address associated with a corresponding user.

3. The computer-implemented method of claim 1, further comprising:
    determining that a second content accessed by the user through the edge server is different from the content; and
    assigning, the user to a second machine learning cluster of the edge server, the second machine learning cluster comprising a second set of tags.

4. The computer-implemented method of claim 1, wherein:
    the obtained information includes a plurality of keywords obtained from the plurality of websites; and
    the first set of tags for the machine learning cluster is derived from one or more of the plurality of keywords.

5. The computer-implemented method of claim 1, wherein the plurality of data objects are communicated by an origin server outside of the content delivery network.

6. The computer-implemented method of claim 1, wherein each data object of the plurality of data objects is an advertisement provided by a publisher of a website accessed by the user.

7. The computer-implemented method of claim 1, wherein the machine learning algorithms comprises a Bayesian clustering analysis.

8. A system comprising:
    one or more processors; and
    memory comprising computer-executable instructions that, upon execution, cause the one or more processors to:
        obtain information based on content accessed by a user through an edge server of a content delivery network;
        associate, at the edge server, the user with other users based on the obtained information based on determining that the other users have accessed the content through the edge server;
        generate, at the edge server, a machine learning cluster based on executing one or more machine learning algorithms, the machine learning cluster comprising a plurality of nodes representative of the user and the associated other users;
        determine a first set of tags for the machine learning cluster, the first set of tags derived from a plurality of websites accessed by the user; and
        obtain a plurality of data objects, an individual data object of the plurality of data objects associated with a second set of tags; and
        as a result of determining that a tag of the second set of tags matches a tag of the first set of tags:
            select the individual data object; and
            cause a region of a website to display the individual data object to the user.

9. The system of claim 8, wherein:
the service outside of the content delivery network is provided by a publisher of the web page; and
each data object of the set of data objects is associated with its corresponding set of tags.

10. The system of claim 8, wherein the selection of the data object further includes determining a relevance score for each data object of the set of data objects.

11. The system of claim 8, wherein another identifier is added into the machine learning cluster, the other identifier indicative of another user that accessed the content through the edge device.

12. The system of claim 8, wherein the tags of the first set of tags are ranked based on a total number of tags being associated with the user.

13. A non-transitory computer-readable storage medium comprising executable instructions that, as a result of being executed by one or more processors of a computer system, cause the computer system to at least:
obtain information based on content accessed by a user through an edge server of a content delivery network;
associate, at the edge server, the user with other users based on the obtained information based on determining that the other users have accessed the content through the edge server;
generate, at the edge server, a machine learning cluster based on executing one or more machine learning algorithms, the machine learning cluster comprising a plurality of nodes representative of the user and the associated other users;
determine a first set of tags for the machine learning cluster, the first set of tags derived from a plurality of websites accessed by the user; and
for each data object of a plurality of data objects associated with a second set of tags, as a result of a tag of the data object matching a tag of the machine learning cluster, cause a region of a website to display the data object to the user.

14. The non-transitory computer-readable storage medium of claim 13, wherein one or more tags of the first set of tags are ranked based on a degree of relevance to one or more web pages accessed by a device associated with the machine learning cluster.

15. The non-transitory computer-readable storage medium of claim 14, wherein the executable instructions further comprise instructions that, as a result of being executed by the one or more processors, cause the computer system to:
obtain, from the device, a request to access a second web page;
extract one or more keywords from the second web page; and
add the one or more keywords into the first set of tags.

16. The non-transitory computer-readable storage medium of claim 13, wherein the machine learning cluster is generated by executing one or more machine learning algorithms at the edge server of the content delivery network.

17. The non-transitory computer-readable storage medium of claim 13, wherein the executable instructions further comprise instructions that, as a result of being executed by the one or more processors, cause the computer system to apply decay factors to the one or more tags corresponding to the each data object of the plurality of data objects.

18. The non-transitory computer-readable storage medium of claim 14, wherein the executable instructions further comprise instructions that, as a result of being executed by the one or more processors, cause the computer system to:
determine that the device is accessing the one or more web pages through another edge server located in another region of the content delivery network; and
associate the device with a second machine learning cluster of the another edge server, the second machine learning cluster comprising a second set of tags.

19. The non-transitory computer-readable storage medium of claim 13, wherein the machine learning cluster is generated asynchronously from a network session established by a device and the edge server of the content delivery network.

20. The non-transitory computer-readable storage medium of claim 14, wherein the executable instructions further comprise instructions that, as a result of being executed by the one or more processors, cause the computer system to determine a user identifier for the device based on at least one of a network address of the device or one or more cookies generated as a result of the device accessing the one or more web pages.

* * * * *